US007809559B2

(12) United States Patent
Kushner et al.

(10) Patent No.: US 7,809,559 B2
(45) Date of Patent: Oct. 5, 2010

(54) METHOD AND APPARATUS FOR REMOVING FROM AN AUDIO SIGNAL PERIODIC NOISE PULSES REPRESENTABLE AS SIGNALS COMBINED BY CONVOLUTION

(75) Inventors: William M. Kushner, Arlington Heights, IL (US); Sara M. Harton, Oak Park, IL (US)

(73) Assignee: Motorola, Inc., Schaumburg, IL (US)

( * ) Notice: Subject to any disclaimer, the term of this patent is extended or adjusted under 35 U.S.C. 154(b) by 905 days.

(21) Appl. No.: 11/459,379

(22) Filed: Jul. 24, 2006

(65) Prior Publication Data

US 2008/0019538 A1 Jan. 24, 2008

(51) Int. Cl.
*G10L 21/02* (2006.01)
*G10L 19/00* (2006.01)
*H04B 15/00* (2006.01)

(52) U.S. Cl. ...................... 704/228; 381/94.1; 704/216; 375/343

(58) Field of Classification Search ................. 704/216; 375/343, 150; 381/94.1; 250/577
See application file for complete search history.

(56) References Cited

U.S. PATENT DOCUMENTS 4,193,004 A * 3/1980 Lobdell et al. .............. 250/577
6,862,326 B1 * 3/2005 Eran et al. .................. 375/343
7,356,074 B2 * 4/2008 Shan .......................... 375/150
2005/0255606 A1 * 11/2005 Ahmed et al. ............... 436/173
2006/0053003 A1 * 3/2006 Suzuki et al. ............... 704/216

OTHER PUBLICATIONS

Senmoto, et al. "Adaptive Decomposition of a Composite Signal of Identical Unknown Wavelets in Noise", IEEE Transactions on Systems, Man and Cybernetics, vol. SMC-2, No. 1, Jan. 1972.
Smith, "Cepstrum Discrimination Function", IEEE Transactions on Information Theory, pp. 332-334, May 1975.
T.J. Cohen, "Source-Depth Determinations Using Spectral, Pseudo-Autocorrelation and Cepstral Analysis", Geophys J.R. Astro, Soc (1970) 20, 223-231, Mar. 1970.
Theodore J. Cohen, "PS and PP Phases From Seven Pahute Mesa Events", Bulletin of the Seismological Society of America, vol. 65, No. 4, 1029-1032, Aug. 1975.
Ulrych, et al., "Homomorphic Deconvolution of Some Teleseismic Events", Bulletin of the Seismological Society of America, vol. 62, vol. 5, p. 1269-1281, Oct. 1972.
Buhl, et al. "The Application of Homomorphic Deconvolution to Shallow-Water Marine Seismology- Part II: Real Data", Geophysics, vol. 39, No. 4 (Aug. 1974), pp. 417-426, 6 Figs.

(Continued)

*Primary Examiner*—Talivaldis I Smits
*Assistant Examiner*—Farzad Kazeminezhad
(74) *Attorney, Agent, or Firm*—Valerie M. Davis

(57) ABSTRACT

A method for removing periodic noise pulses from a continuous audio signal generated in a pressurized air delivery system includes the steps of: detecting, in a time-windowed segment of the continuous audio signal generated in the pressurized air delivery system, a plurality of the periodic noise pulses having a pulse period and being representable in the form of a plurality of signal components combined by convolution; deconvolving the plurality of signal components to generate a plurality of deconvolved signal components; and removing at least a portion of the periodic noise pulses from the time-windowed segment of the continuous audio signal using the deconvolved signal components.

20 Claims, 14 Drawing Sheets

OTHER PUBLICATIONS

M.J. Shensa, "Complex Exponential Weighting Applied to Homomorphic Deconvolution", Geophys, J.R. Astr. Soc. (1796) 44, 379-387, 1976.
Allen V. Oppenheim, "Speech Analysis-Synthesis System Based on Homomorphic Filtering", Lincoln Laboratory, Massachusetts Institute of Technology, Lexington, MA, vol. 45 No. 2, 1969.
Jae S. Lim, "Spectral Root Homomorphic Deconvolution System", IEEE Transactions on Accoustics, Speech, and Signal Processing, vol ASSP-27, No. 3, Jun. 1979.
Chapter 10- Homomorphic Signal Processing, pp. 481-529, Oppenheim et al. 1975.
Rabiner, L.R. and Schafer, R.W., "Digital Processing of Speech Signals", Chapter 7, Prentice-Hall, Inc., Englewood Cliffs, New Jersey, 1978.
Oppenheim, A.V. and Schafer, R.W., "Digital Signal Processing", Chapter 10, Prentice-Hall, Inc., Englewood Cliffs, New Jersey, 1975, pp. 511-528.
Schafer, R.W., "Echo Removal by Discrete Generalized Linear Filtering",Tech. Rept. 466, MIT Research Laboratory of Electronics, Cambridge MA, Feb. 1969.
Oppenheim, A.V. "Superposition in a Class of Nonlinear Systems," Tech. Rept. 432, Research Laboratory of Electronics, MIT, Cambridge, MA, Mar. 1965.
Taxt, Torfinn, "Restoration of Medical Ultrasound Images Using Two-Dimensional Homomorphic Deconvolution", IEEE Transactions on Ultrasonics, Ferrorelectrics, and Frequency Control, vol. 42, No. 4, Jul. 1995, p. 543-554.
Childers, Donald G., Skinner, David P., Kemerait, Robert C, "The Cepstrum: A Guide to Processing", Proceedings of the IEEE, vol. 65, No. 10. Oct. 1977, p. 1428-1443.
Oppenheim, A.V., Schafer, R.W., and Stockham, T.G., "Nonlinear Filtering of Multiplied and Convolved Signals", Proc. IEEE, vol. 56, No. 8, Aug. 1968, pp. 1264-1291.

* cited by examiner

1210

METHOD AND APPARATUS FOR REMOVING FROM AN AUDIO SIGNAL PERIODIC NOISE PULSES REPRESENTABLE AS SIGNALS COMBINED BY CONVOLUTION

FIELD OF THE INVENTION

The present invention relates generally to a pressurized air delivery system coupled to a communication system and more specifically to removing periodic noise from an audio signal generated therein.

BACKGROUND OF THE INVENTION

Good, reliable communications among personnel engaged in hazardous environmental activities, such as fire fighting, are essential for accomplishing their missions while maintaining their own health and safety. Working conditions may require the use of a pressurized air delivery system such as, for instance, a Self Contained Breathing Apparatus (SCBA) mask and air delivery system. However, even while personnel are using such pressurized air delivery systems, it is desirable that good, reliable communications be maintained and personnel health and safety be effectively monitored.

FIG. 1 illustrates a simple block diagram of a prior art system 100 that includes a pressurized air delivery system 110 coupled to a communication system 130. The pressurized air delivery system typically includes: a breathing mask 112, such as a SCBA mask; a mask air regulator 118; a high pressure hose 120 connecting the regulator 118 to a low-air detection alarm device 122; and a high pressure air cylinder/tank 126 which supplies air to the system through an air cylinder supply valve 124. The low-air alarm device 122, usually mechanical in nature, produces an acoustic periodic alarm signal indicating when the supply of air in the tank is low. This device is usually attached to the air tank near the air tank supply valve 124. This low-air alarm signal is referred to herein as the Low-Air Alarm (LAA) noise.

Depending upon the type of air delivery system 110 being used, the system 110 may provide protection to a user by, for example: providing the user with clean breathing air; keeping harmful toxins from reaching the user's lungs; protecting the user's lungs from being burned by superheated air inside of a burning structure; and providing protection to the user from facial and respiratory burns. Moreover, in general the mask is considered a pressure demand breathing system because air is typically only supplied when the mask wearer inhales.

Communication system 130 typically includes a conventional microphone 132 that is designed to record the speech of the mask wearer and that may be mounted inside the mask, outside and attached to the mask, or held in the hand over a voicemitter port (a thin metal plate designed to pass speech sounds from inside the mask to the outside with minimal attenuation) on the mask 112. Communication system 130 further includes a communication unit 134 such as a two-way radio that the mask wearer can use to communicate his speech, for example, to other communication units. The mask microphone device 132 may be connected directly to the radio 134 or through an intermediary electronic processing device 138. This connection may be through a conventional wire cable (e.g., 136), or could be done wirelessly using a conventional RF, infrared, or ultrasonic short-range transmitter/receiver system. The intermediary electronic processing device 138 may be implemented, for instance, as a digital signal processor and may contain interface electronics, audio amplifiers, and battery power for the device and for the mask microphone.

There are some shortcomings associated with the use of systems such as system 100. These limitations will be described, for ease of illustration, by reference to the block diagram of FIG. 2, which illustrates the mask-to-radio audio path of system 100 illustrated in FIG. 1. Speech input 210 (e.g., $S_i(f)$) from the lips enters the mask (e.g. a SCBA mask), which has an acoustic transfer function 220 (e.g., MSK(f)) that is characterized by acoustic resonances and nulls. These resonances and nulls are due to the mask cavity volume and reflections of the sound from internal mask surfaces. These effects characterized by the transfer function MSK(f) distort the input speech waveform $S_i(f)$ and alter its spectral content. Other sound sources are noises generated from the breathing equipment including regulator inhalation noise and low-air alarm noise 230 that also enters the mask and is affected by MSK(f). Another transfer function 240 (e.g., $NP_k(f)$) accounts for the fact that the noise is generated from a slightly different location in the mask than that of the speech. The low-air alarm noise 230 may be conducted from the alarm device into the mask though the air but primarily through the air supply hose. The speech and noise $S(f)$ are converted from acoustical energy to an electronic signal by a microphone and amplifier, 250, which has transfer function (e.g., MIC(f)), producing an output signal 260 (e.g., $S_o(f)$) that may then be input into another device for further processing or directly into a radio for transmission.

Returning to the shortcomings of systems such as system 100, an example of such a shortcoming relates to the generation by these systems of loud acoustic noises as part of their operation. More specifically, these noises can significantly degrade the quality of communications, especially when used with electronic systems such as radios. One such noise that is a prominent audio artifact introduced by a pressurized air delivery system, like a SCBA system, is the low-air alarm noise, which is illustrated in FIG. 2 as box 230.

The low-air alarm (LAA) noise occurs as a low frequency, periodic, pulsatile harmonic-rich broadband noise generated by an alarm device coupled to the pressurized air delivery system (FIG. 1, 122). The alarm noise is designed to be generated when the air tank pressure drops below a specified level, indicating that the air supply is low (generally when about five minutes of breathable air remains in the tank). This noise is picked up by the mask communications system microphone along with ensuing speech, and has about the same energy as the speech. The LAA noise, once started, is continuous until the air in the tank runs out, and a SCBA wearer has little or no control over the alarm noise. The broad spectrum of the noise masks any concurrent speech signal and interferes with communications. The LAA noise can severely affect communication systems that use digital radios. Certain widely used digital codecs, especially ones based on a parametric speech model, are very sensitive to periodicities in a signal and their operation can be severely corrupted by certain periodic noises. In addition, the LAA noise is, in general, very annoying to a listener.

Thus, there exists a need for methods and apparatus for effectively detecting and attenuating low-air alarm noise that corrupts audio communication in a system that includes a pressurized air delivery system coupled to a communication system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF EMBODIMENTS OF THE INVENTION

Figure 1:
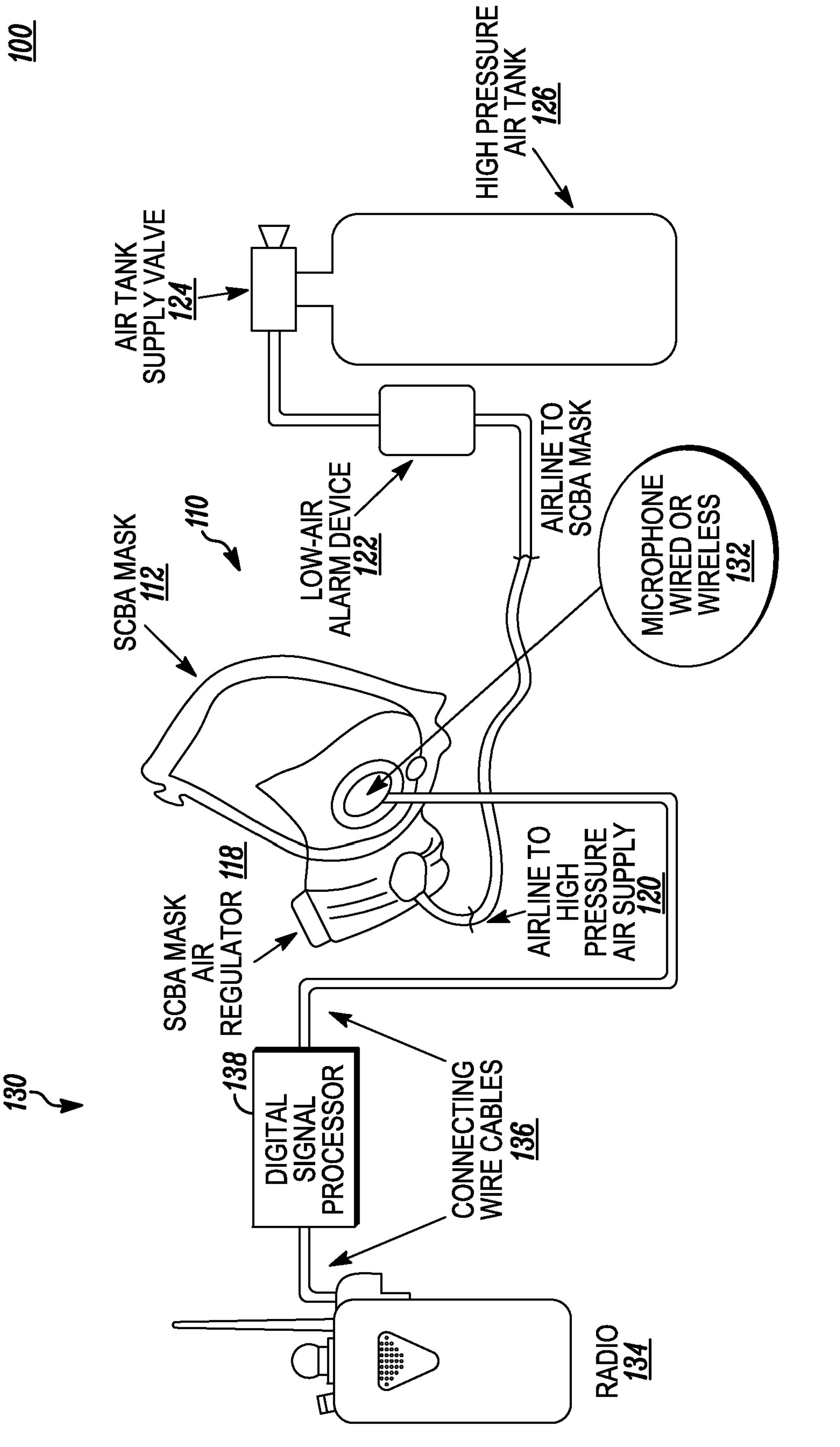
PRIOR ART FIG. 1
FIG. 1 illustrates a block diagram of a prior art system that includes a pressurized air delivery system for breathing coupled to a communication system.

Before describing in detail embodiments that are in accordance with the present invention, it should be observed that the embodiments reside primarily in combinations of method steps and apparatus components related to a method and apparatus for removing periodic noise pulses in an audio signal. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for removing periodic noise pulses in an audio signal. The non-processor circuits may include, but are not limited to, transmitter apparatus, receiver apparatus, and user input devices. As such, these functions may be interpreted as steps of a method for removing periodic noise pulses in an audio signal described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment of the present invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device and a magnetic storage device. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, a method, apparatus and a computer-readable storage element for removing periodic noise pulses from a continuous audio signal generated in a pressurized air delivery system is disclosed. In general, the method comprises the steps of: detecting, in a time-windowed segment of the continuous audio signal, a plurality of the periodic noise pulses having a pulse period and being representable in the form of a plurality of signal components combined by convolution; deconvolving the plurality of signal components to generate a plurality of deconvolved signal components; and removing at least a portion of the periodic noise pulses from the time-windowed segment of the continuous audio signal using the deconvolved signal components. The method further beneficially includes an add/overlap process in accordance with the teachings herein to attenuate substantially most if not substantially all of the periodic noise pulses from the audio signal.

In an embodiment, the audio signal is output from a microphone (e.g., a microphone signal) that is part of a communication system coupled to the pressurized air delivery system. The microphone signal includes speech and may also include low-air alarm (LAA) noise pulses. The microphone signal is digitized, and the samples assembled into frames of specified length (e.g., the time-windowed segment of the microphone signal). Each frame of digitized data is then processed for detecting presence of some of the LAA noise pulses, and if present, a pulse period of the LAA noise pulses within the frame is determined (which corresponds to a fundamental period of a pulse train characterizing the noise pulses). The digitized data frame is then processed to transform the sample data signal from the time domain into the cepstral domain, wherein the signal includes a primary noise pulse component and an impulse train component. In the cepstral domain the signal component due to the impulse train is separated and removed from the composite cepstral signal using a process of cepstral filtering. With the impulse train component removed, the remaining cepstral signal containing the primary pulse and any speech is converted back into the time domain. The processed frames of the now time domain signal are then re-synthesized into a continuous signal. The Add/Overlap process further removes the primary pulses from each frame of data during the re-synthesis process to generate an audio signal that is virtually free of the LAA (or other periodic) noise. Those skilled in the art will realize that the above recognized advantages and other advantages described herein are merely exemplary and are not meant to be a complete rendering of all of the advantages of the various embodiments of the present invention.

Figure 3:
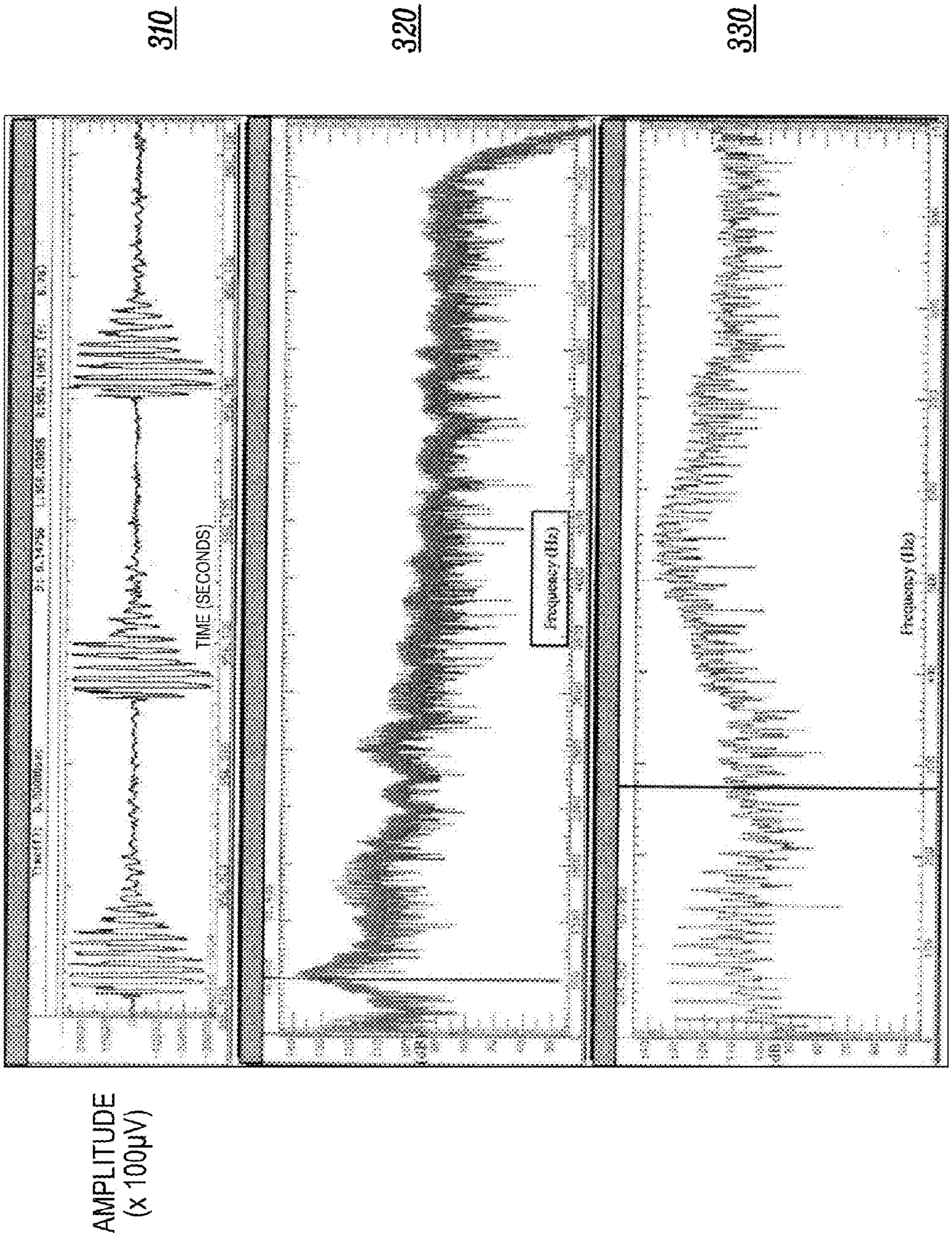
PRIOR ART FIG. 3
FIG. 3 illustrates an example of a low-air alarm (LAA) noise generated by a SCBA air regulator and its power spectrum.

Before describing in detail the various aspects of the present invention, it would be useful in the understanding of the invention to provide a more detailed description of the low-air alarm noise that was briefly described above. As can be seen in FIG. 3, the LAA noise is a periodic, pulse-like noise with typically a low pulse repetition rate, generally between 20 and 50 Hz (310). Generally, the LAA noise may be generated by a mechanical clapper or bell type device. The noise is rich in harmonic content, and its spectrum is broadband with prominent harmonic peaks occurring throughout the speech spectral bandwidth (wideband spectrum 320, and narrowband spectrum 330). Because some of the low-air alarms are mechanical in nature, the waveform of each pulse may vary slightly as will the pulse repetition rate over time (310). Thus, the peaks may vary somewhat in frequency and magnitude depending on the variance in the air pressure and alarm design. However, the characteristics of the pulses and their pulse period are fairly consistent over short (~1 second or longer) time periods.

Figure 4:
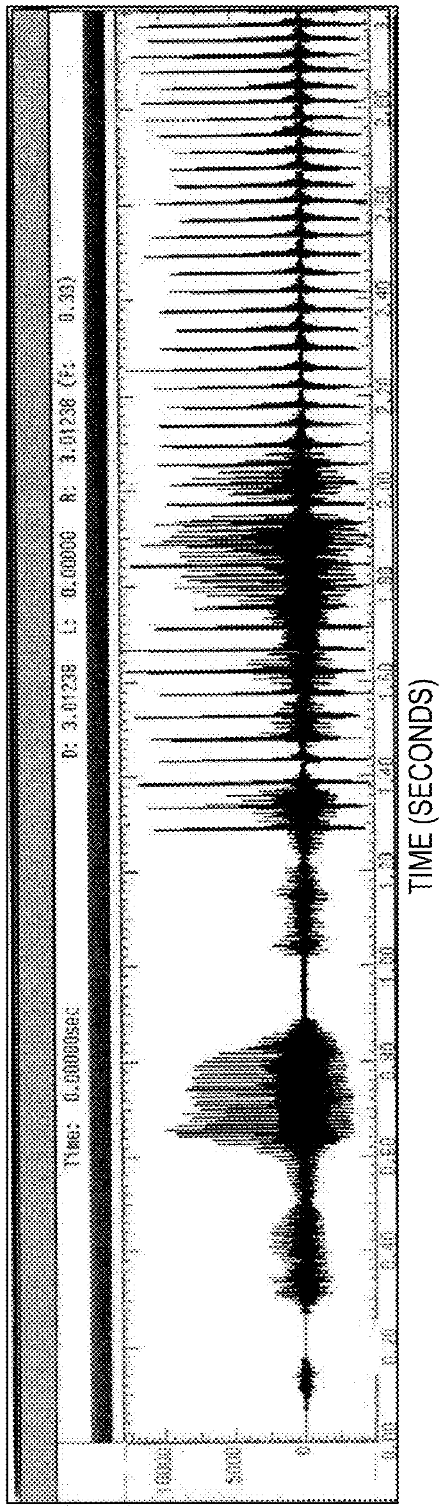
PRIOR ART FIG. 4
FIG. 4 illustrates an example of an SCBA microphone speech signal corrupted by low-air alarm noise.

FIG. 4, illustrates an example of speech 410 recorded from a SCBA system when the low-air alarm is active. As FIG. 4 demonstrates, the amplitude of the LAA noise can be as high as or higher than the speech signal and will make the speech less intelligible both by corrupting the speech directly and by causing an increase in estimation errors by a digital codec in the communication path.

Figure 5:
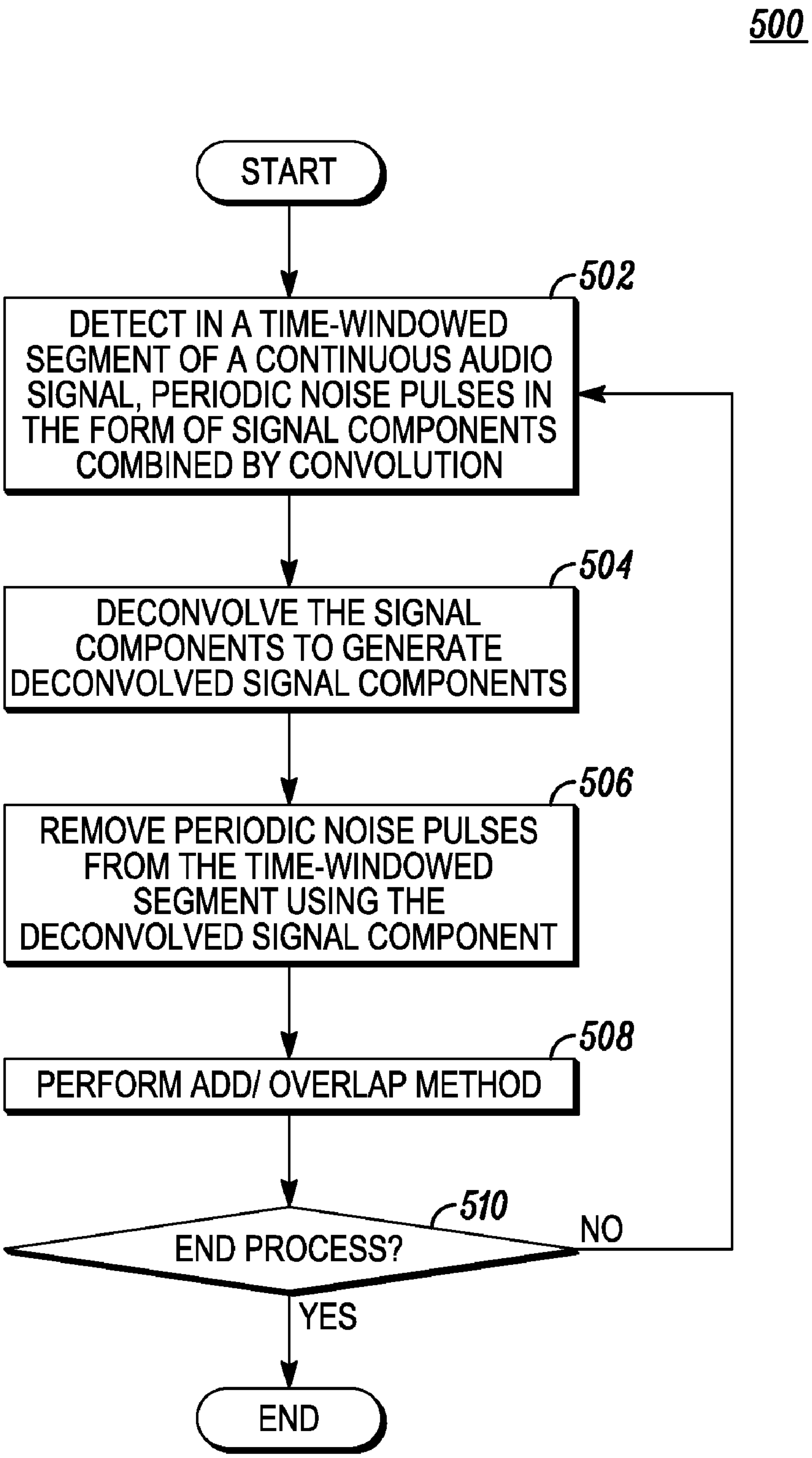
FIG. 5 illustrates a flow diagram of a method for removing periodic noise from an audio signal, generated in a pressurized air delivery system, in accordance with an embodiment of the present invention.

Referring now to FIG. 5, a method for removing periodic noise pulses from an audio signal generated in a pressurized air delivery system is shown and indicated generally at 500. The method can be performed in a pressurized air delivery system such as system 100 illustrated in FIG. 1, and includes the steps of: detecting (502), in a time-windowed segment of the continuous audio signal generated in the pressurized air delivery system, a plurality of the periodic noise pulses having a pulse period and being representable in the form of a plurality of signal components combined by convolution; deconvolving (504) the plurality of signal components to generate a plurality of deconvolved signal components; and (506) removing at least a portion of the periodic noise pulses from the time-windowed segment of the continuous audio signal using the deconvolved signal components. In one embodiment, method 500 also includes an add/overlap method or process 508 as described below in detail to remove substantially most and ideally all of the noise from the audio signal. The method can be continuously applied to a continuous audio signal until some stopping criterion is reached (510) such as, for example, when the system is turned off or, in the case where the noise being detected is LAA noise, when the LAA device 122 becomes disengaged.

Method 500 can be implemented in various device locations in system 100 using a processing device such as, for instance, a digital signal processor (DSP). This DSP could be included, for example, in the radio communication device 134, the microphone 132 or another device, e.g., 138 external to the radio and the microphone or a combination of the three. The device further includes a suitable interface for receiving the audio signal, which could be wired (e.g., a cable connection) or wireless. Moreover, method 500 could be implemented as a computer-readable storage element having computer readable code stored thereon for programming a computer (e.g., comprising a processing device) to perform the method.

In one embodiment, the noise being detected and eliminated is LAA noise generated by device 122, which corrupts the speech. However, the teachings herein are not limited to that particular noise, but are also applicable to other periodic noise having characteristics that are similar to that of the LAA noise, wherein the noise can be modeled as signal components that are combined by convolution in the time domain. As such, other alternative implementations of processing different types of periodic noises are contemplated and are within the scope of the various teachings herein.

The method, in accordance with this embodiment of the present invention, when implemented to eliminate LAA noise is also referred to herein as the CANA (Cepstral Alarm Noise Attenuator) method. The basis of the CANA method for eliminating air regulator low-air alarm noise is that the continuous alarm noise can be thought of as the convolution of a single alarm pulse waveform of arbitrary shape with an impulse train having a given periodicity. Through the use of spectral filtering and deconvolution (e.g., cepstral) methods, the periodic pulse component can be separated from the basic pulse waveform and removed leaving only the initial attenuated basic pulse waveform and any concurrent speech signal. An additional aspect of the CANA method is the employment of a unique pulse-period-synchronous add-overlap method to eliminate the remnant pulse waveform and re-synthesize a continuous output waveform.

Figure 6:
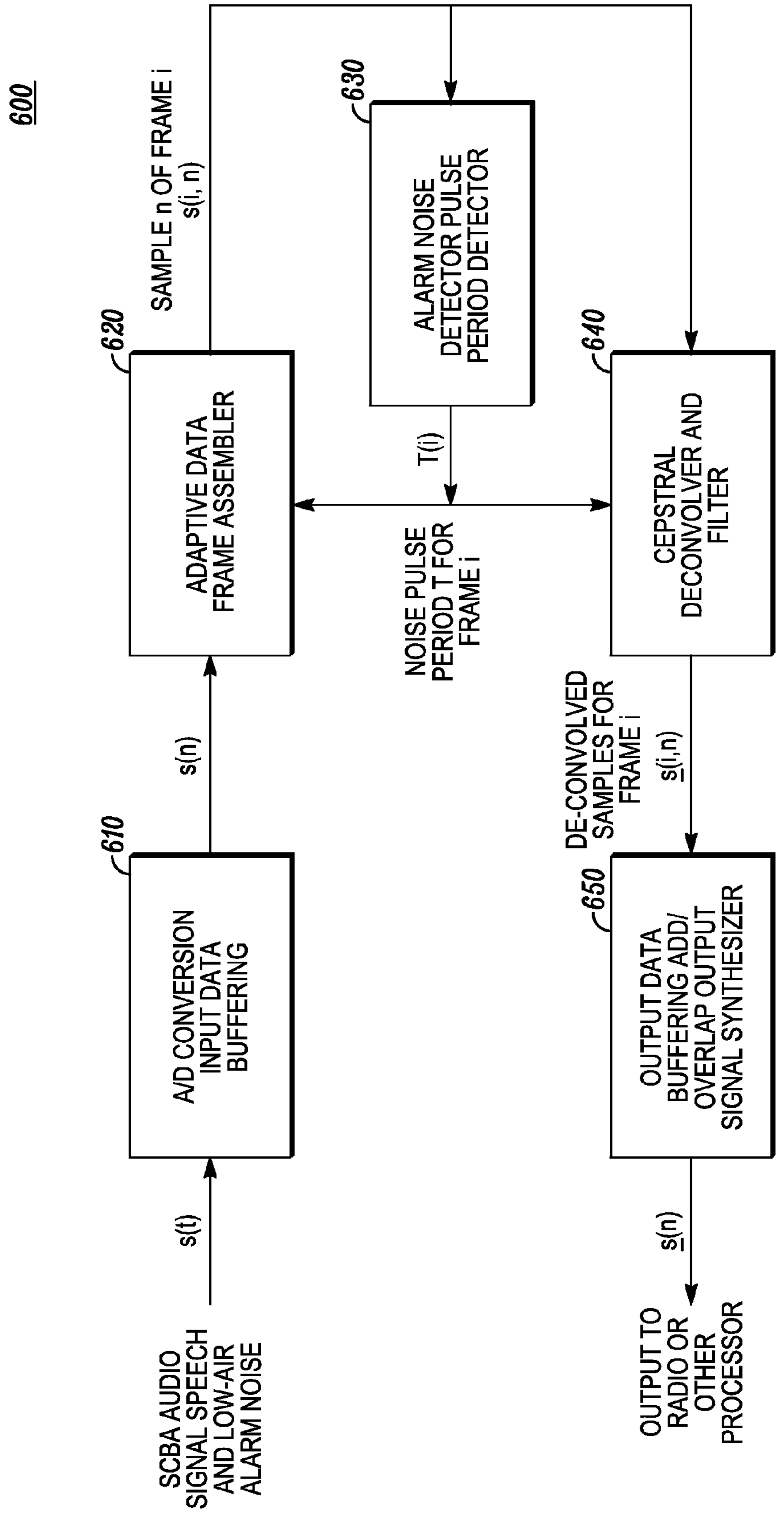
FIG. 6 illustrates a diagram of the processing blocks that characterize a method, referred to as the CANA method herein, for removing periodic noise from an audio signal, generated in a pressurized air delivery system, in accordance with an embodiment of the present invention.

A more detailed block diagram of an exemplary implementation of a CANA method 600 is shown in FIG. 6. Method 600 can be divided into five sections represented by the following functional blocks or modules: A/D (analog-to-digital) Conversion and Input Data Buffering 610, Adaptive Data Frame Assembler 620, Alarm Noise Detector Pulse Period Detector 630, Cepstral Deconvolver and Filter 640, and Add/Overlap Output Data Synthesizer 650. Blocks 610, 620 and 630 correspond to step 502 of FIG. 5. Block 640 corresponds to blocks 504 and 506 of FIG. 5. Block 650 corresponds to block 508 of FIG. 5.

Figure 2:
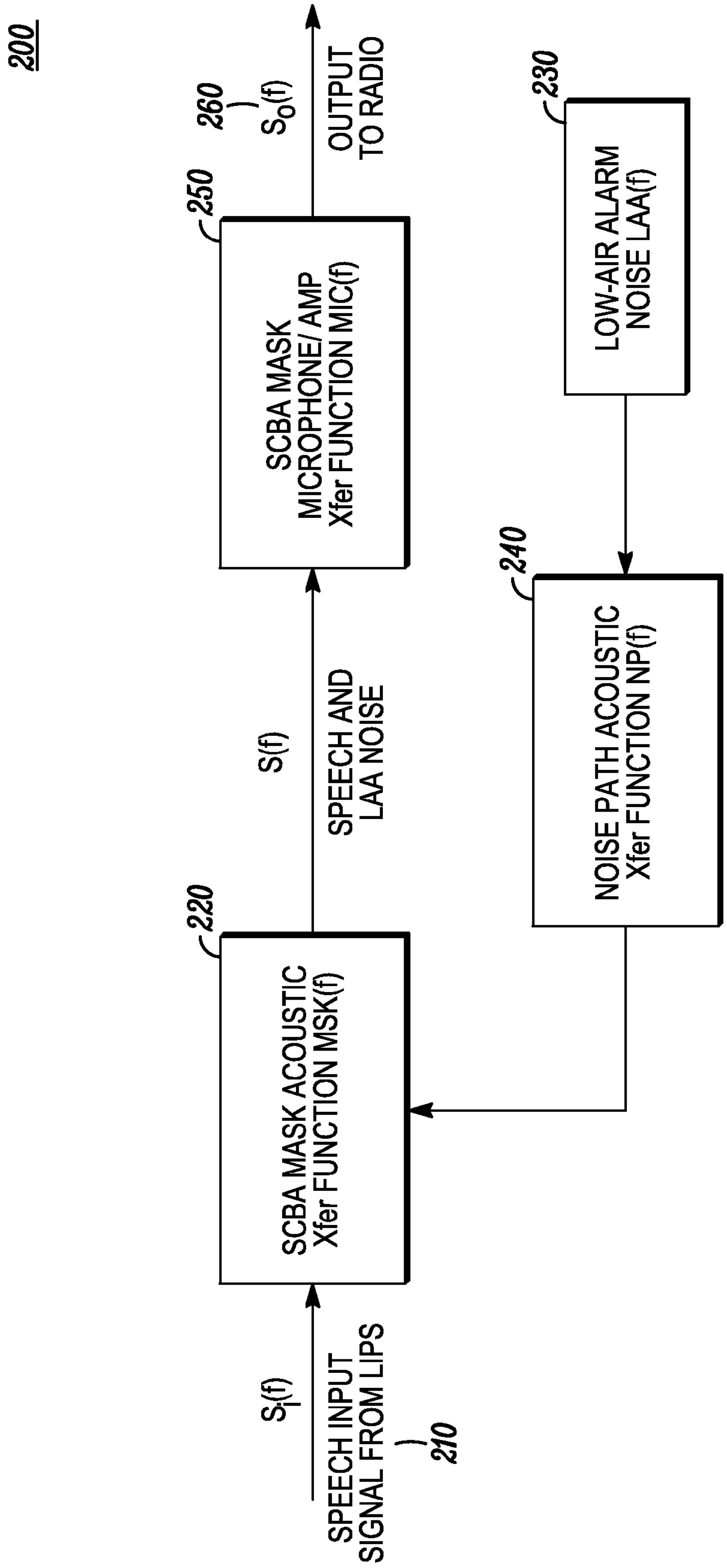
PRIOR ART FIG. 2
FIG. 2 illustrates schematically the mask-to-radio audio path of the system illustrated in FIG. 1.

The basic methodology of the CANA method 600 can be summarized as follows. In an embodiment, block 610, A/D Conversion and Input Data Buffering, samples a continuous analog audio signal from a pressurized air breathing apparatus microphone (e.g., as illustrated in FIG. 2) and stores the data in a finite length circular sample buffer in a continuous manner. By this is meant that when the circular buffer has been filled the first time, the oldest sample is replaced by a new sample from the audio signal. Thus the buffer always contains the latest block of signal samples. The audio signal includes a combination of speech and LAA noise. Block 620, the Adaptive Data Frame Assembler, extracts a subset of samples from the data buffer, less than or equal to the buffer length, to form a data frame (also referred to herein as a "time-windowed segment" or "analysis frame" or "analysis data frame") for further processing. The length of the frame is dependent upon the pulse period of the LAA noise to insure that at least two alarm pulses are included in the analysis frame. Block 630, the Alarm Noise Detector Pulse Period Detector, determines whether LAA noise is present in the input signal, and if it is present, further determines the pulse period information for the LAA noise. The analysis frame is then passed to block 640, the Cepstral Deconvolver and Filter block, which applies a smoothing window and transforms the signal into the cepstral domain. Block 640 deconvolves a periodic impulse train cepstrum component from an initial basic pulse waveform cepstrum component and removes (or filters out) the impulse train cepstrum component, leaving only the initial pulse waveform cepstrum component and any speech in a deconvolved signal analysis frame. The deconvolved signal analysis frame is then transformed back into the time domain and "un-windowed." The deconvolved frame of data is passed to the Add/Overlap Output Signal Synthesizer 650 where it is merged with data from a previous analysis block to form a composite output signal. This process 650 removes the remaining basic pulse waveform from the signal data frame, thereby, substantially completely removing all of the previously present low-air alarm noise pulses. Process 600 is repeated frame by frame in a continuous manner. The individual processing steps of CANA method 600 will now be described in more detail.

Figure 7:
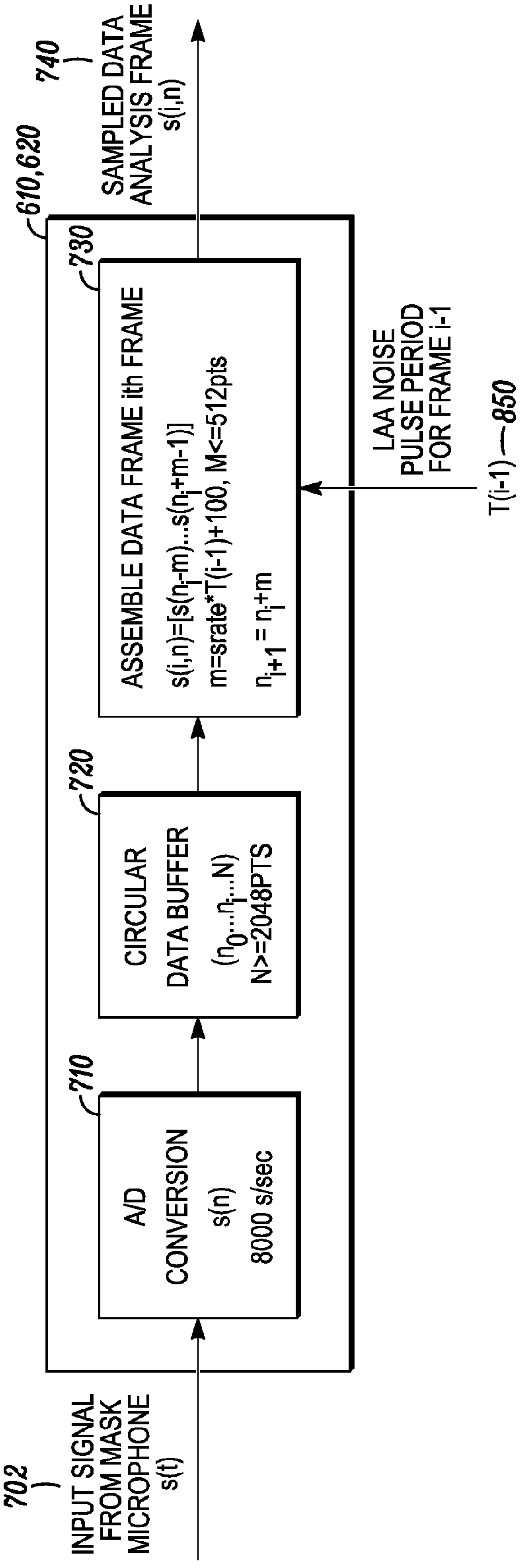
FIG. 7 illustrates a block diagram of an A/D Input Data Buffering and Data frame Assembler processor of the CANA method of FIG. 6.

FIG. 7 illustrates an exemplary embodiment of blocks 610 and 620 of FIG. 6. Block 610 comprises an A/D conversion block 710 and a circular data buffer 720, and block 620 comprises a block 730 for assembling the data frames. A/D conversion block receives an analog signal 702 from the SCBA mask (e.g., the microphone signal) having speech and possibly LAA noise, samples signal 702 at an exemplary nominal rate of 8000 samples per second and stores the signal samples in a circular data buffer 720 of length 2048 or more samples, for example. When the buffer 720 has the desired number of samples, e.g., when it is at least half filled, the Data Frame Assembler 730, is signaled that data is available. When the circular buffer 720 is completely filled it can write over the old data on a sample-by-sample basis in a continuous manner. Those skilled in the art will realize that the sampling rate, buffer length and desired number of samples before processing by block 730 may be varied depending on design parameters and desired system performance and that different sampling rates, buffer lengths and desired number of samples before processing by block 730 are within the scope of the teachings herein.

The Data Frame Assembler 730 extracts data from the circular buffer of up to 1024 samples, for instance, and constructs and outputs an analysis frame 740 from the buffer data for further processing. The signal analysis frame size is based on the LAA pulse period by making each analysis frame length equal to, for example, at least twice a calculated pulse period 850 (as determined by module 630 of FIG. 6) plus a margin of 100 samples to ensure that at least two LAA pulses are contained within the frame. For example, the initial analysis data frame size can be set to a duration of twice the lowest expected alarm pulse period of T=50 msec (20 Hz) plus a small margin (12.5 msec). This amounts to 112.5 msec or 900 samples at the 8000 Hz sampling rate. The size of subsequent frames is based on the pulse period as determined in the previous frame. Moreover, successive analysis frames extracted from the circular buffer are overlapped by 50%. This overlapping of the analysis frames insures that pulses from the end of frame s(i-1,n) are at the start of analysis frame s(i,n) (i indicating the data frame index), which aid in implementing signal processing in block 650 as described below in detail by reference to FIGS. 12 and 13.

Figure 8:
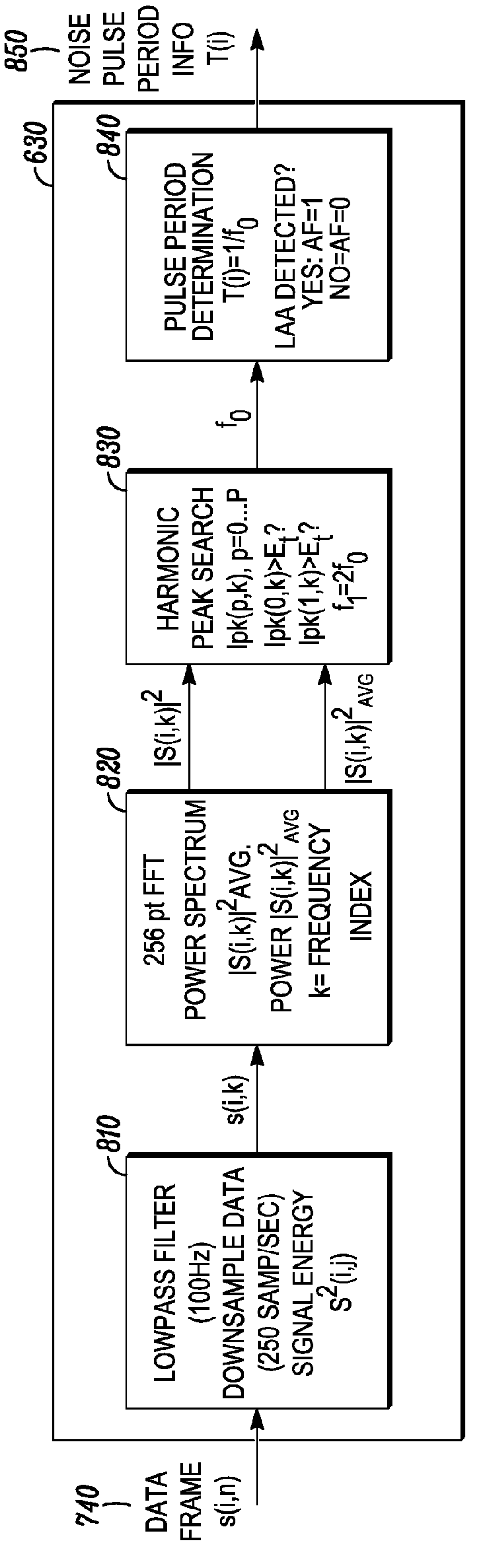
FIG. 8 illustrates a block diagram of an Alarm Noise Detector and Pulse Period Detector processor of the CANA method of FIG. 6.

Block 630 of the CANA method (600) is a detector to detect the presence of the noise and determine the alarm pulse period. An exemplary implementation of this block is detailed in FIG. 8. As previously mentioned, the pulse period is important in determining the proper analysis frame size to insure that at least two LAA pulses are contained in each frame. The LAA noise and pulse period detection procedures used in this exemplary embodiment of the CANA method are spectrally based, though alternative methodologies such as time-energy analysis or autocorrelation may also be used. The CANA alarm detector takes advantage of the harmonic structure and low periodicity of the low-air alarm signal compared with the pitch component of voiced speech.

Referring back to the structure of a low-air alarm noise in FIG. 3, the wideband spectrum in FIG. 3 (waveform 320) shows a peak at 500 Hz, corresponding to the damped fundamental oscillation in each pulse of this particular alarm signal. The numerous harmonics shown in the 1000 Hz sub-band (FIG. 3, waveform 330) are due to the noise pulse repetition rate. These harmonics look very much like speech pitch harmonics and could be confused with them. However, the alarm pulse harmonics are multiples of the base alarm pulse rate of from 20 to 40 Hz. The lowest common pitch frequency for human speech is about 80 Hz. Thus, from two to four strong alarm pulse harmonics can be expected to appear below 80 Hz when the low-air alarm is active. Since these harmonics are below normal human pitch frequencies, they provide a reliable way of distinguishing the presence of the low-air alarm from speech or other higher frequency noise components.

The low-air alarm noise detector 630 operates by trying to find and verify the low frequency harmonics of the signal that are below typical speech pitch frequencies. It accomplishes this using both frequency and time-signal energy analyses. The current analysis data frame 740, which has a duration that is slightly greater than twice the LAA pulse period, insures that at least 2 alarm pulses are present for processing by noise detector 630. Detector 630 comprises a low-pass filter 810, an FFT (Fast Fourier Transform) block 820, a harmonic peak search block 830 and a pulse period determination block 840 that outputs the estimated LAA noise pulse period 850.

The detector 630 operates by first filtering the analysis frame signal 740 with a 100 Hz low-pass filter (810) and down-sampling the result within a predefined limit, for example, from about 8 KHz to about 250 Hz. Since we are generally only interested in detecting periodicities of the LAA signal, and since the LAA fundamental pulse frequency and first few harmonics are less than 100 Hz, we only examine frequencies in this range. Thus we save computation by down sampling the signal to 250 Hz which is greater than twice the 100 Hz bandwidth and allows using a 256 point FFT. Energy of the time domain down-sampled signal is then determined by squaring each sample, and average energy of the frame is determined. A 256 point FFT of the energy signal is taken (820) to determine a power spectrum, $|S(i,k)|^2$. This size FFT gives about 1 Hz (250 Hz/256 pts=0.977 Hz/pt) of frequency resolution. Note that k corresponds to an index of frequency in the range of 0 to 125 Hz. The harmonic peak search block 830 searches the power spectrum to locate at least two maximum spectral energy peaks satisfying one or more predefined parameters, wherein the located energy peaks correspond to two detected LAA noise pulses. In an embodiment, the one or more parameters include a maximum periodicity threshold and a minimum energy threshold.

For example, a search is done (830) through each frequency bin of the sampled power spectrum $|S(i,k)|^2$ for a maximum spectral energy peak in a range from 20 Hz to 50 Hz (19<k<51). Bin energy Ipk(0,k) and corresponding frequency $f_0$ (0.9765k) are stored. Next, a maximum energy peak in a range from 40 Hz to 100 Hz, Ipk(1,k) and corresponding frequency $f_1$, are found. If the frequency of the second peak satisfies a maximum periodicity threshold, e.g., is within +/−5 Hz of twice the frequency of the first peak, and if both peaks exceed a minimum energy threshold, $E_t$, determined as a percentage of the average spectral energy $|S(i,k)|^2_{avg}$, presence of the alarm noise is assumed and an "alarm present" detection flag AF can be set to 1 (840) to indicate such a detection. The alarm pulse period 850 is determined (840) from the frequency of the fundamental spectral energy peak as, $T(i)=1/f_0$. This pulse period information (850) is used by blocks 620 and 640 as shown in FIG. 6.

Figure 9:
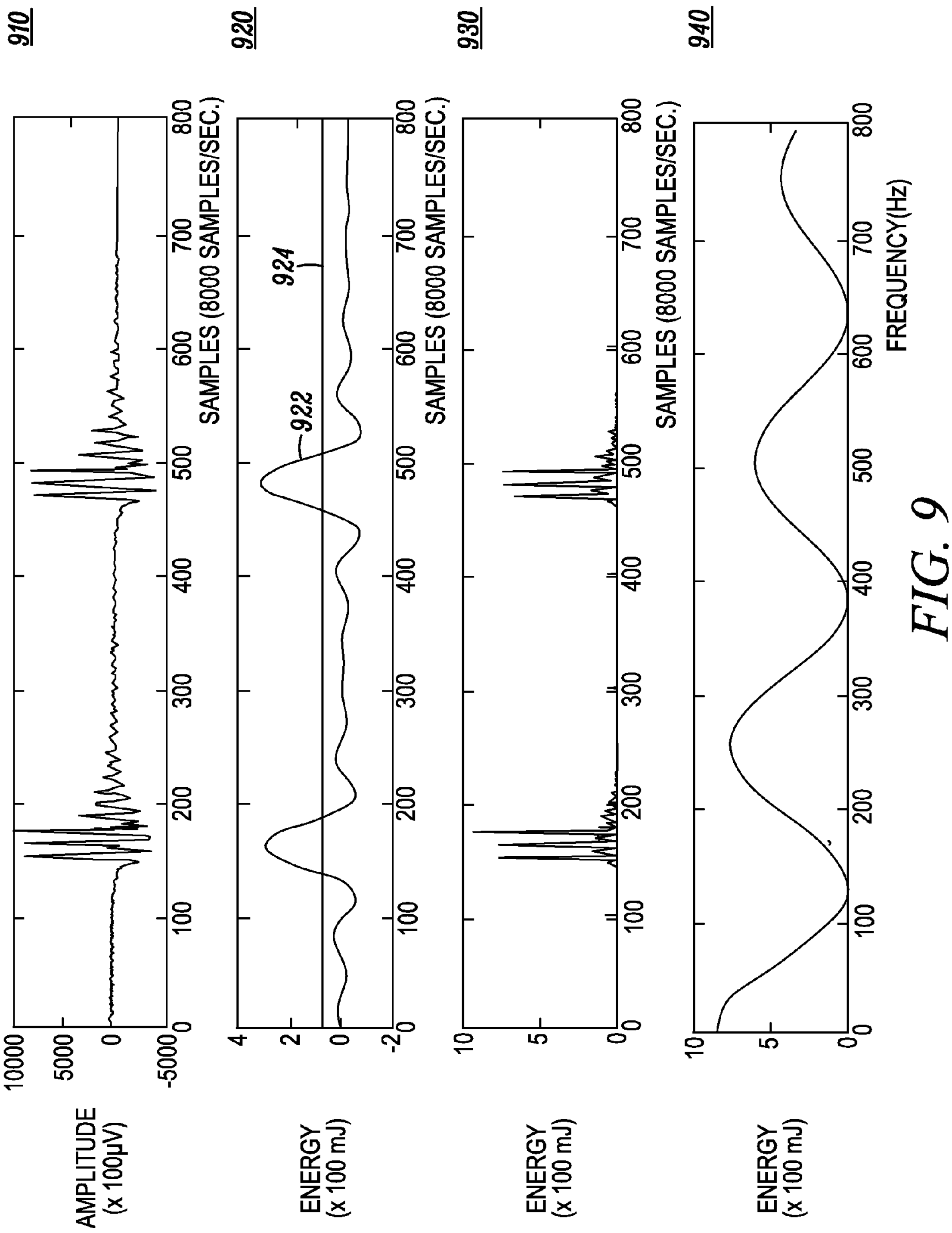
FIG. 9 illustrates example waveforms from the Alarm Noise and Pulse Period Detector processor of FIG. 8.

Examples of the alarm detector 630 signals and outputs are shown in FIG. 9. A top plot (910) shows an analysis data frame containing two low-air alarm pulses, corresponding to input data frame 740. A second plot (920) shows the smoothed (or filtered) energy (922) of the data frame along with the average energy (924), as determined in block 810. A third plot (930) shows un-smoothed data frame energy. A fourth plot (940) shows smoothed spectral energy of the data frame with frequency locations of fundamental $f_0$ and first harmonic $f_1$ of the alarm pulse signal, as determined in block 830, marked respectively by an "x" and a "+". In this embodiment, the pulse period for the ith analysis frame, T(i), is determined as the inverse of the pulse repetition rate frequency as determined in 840, but other methods could be used. This pulse period information is used by module 620 to set the analysis window length (as explained above), and by the Cepstral Deconvolver and Filter block 640 to generate an appropriate lifter function for removing the LAA noise pulse train as will be discussed next.

Figure 10:
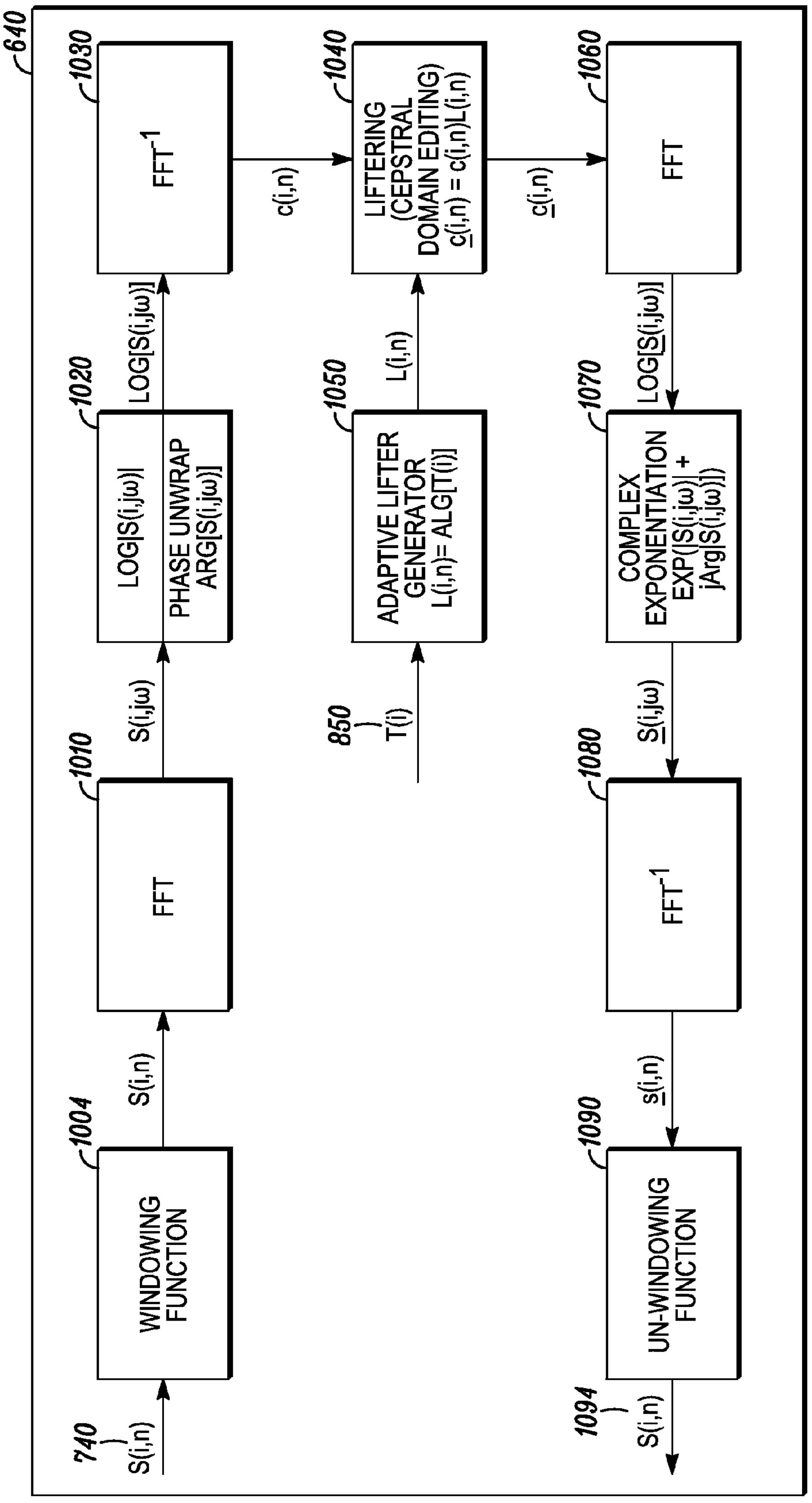
FIG. 10 illustrates a simple block diagram of a Cepstral Deconvolver and Filter processor of the CANA method of FIG. 6.

FIG. 10 shows details of an exemplary Cepstral Deconvolver and Filter block 640. Cepstral deconvolution is a type of homomorphic signal processing, based on the concept of the cepstrum of a signal, which is designed to separate convolved signals. The theory behind cepstral processing is well known in the art and will not be described in detail here for the sake of brevity. The cepstrum of a signal is defined as the inverse Fourier transform of the complex logarithm of the complex spectrum of a signal. Cepstral deconvolution is a process performed in the cepstral domain to separate signals or signal components combined by convolution in the time domain. Cepstral deconvolution can be employed, on signals that can be viewed or represented as a primary waveform upon which are superimposed time-delayed copies or signals that can be represented as a primary waveform convolved with a sequence of impulses at the time occurrences of the copies, in order to separate the primary component from the time-delayed copies.

In accordance with the teachings herein, embodiments of the invention can use a signal processing deconvolution technique (such as cepstral deconvolution, for instance) to process periodic noise signals included in an audio signal generated in a pressurized air delivery system, where the periodic noise pulses can be represented as two or more signals or signal components combined by convolution in the time domain. The LAA noise signal is an example of such a signal having periodic noise pulses that can be viewed in this manner. Thus, in an embodiment, the CANA method uses cepstral deconvolution to deconvolve a primary pulse shape from a periodic impulse train of subsequent pulses in the LAA signal and remove (or substantially attenuate) the impulse train component, leaving only the primary pulse shape. The primary pulse shape can itself also be removed (or substantially attenuated) by further processing (in block 650 described below in further detail). The fundamental mathematics behind this procedure will now be presented. The discussions below are limited to cepstral deconvolution signal processing for illustrative purposes only and is not meant to limit the scope of the teachings herein. Other deconvolution techniques such as, for example, spectral root homomorphic deconvolution are included within the scope of these teachings.

Consider a suitable length frame of a sampled microphone output of a pressurized air delivery system as depicted in FIG. 1. Assume this signal sample frame contains low-air alarm noise comprising a sequence of two or more highly correlated alarm pulses. The low-air alarm noise can be represented as the convolution of a primary pulse shape with a series of impulses occurring at time intervals equal to multiples of the pulse period. Ignoring other additive signals (e.g. speech) for the moment, the low-air alarm signal s(n) can be represented as:

$$s(n) = x(n) + \sum_{k=1}^{M} \alpha_k x(n - n_k), \qquad \text{Eq. 1}$$

where s(n) is the composite alarm signal, x(n) is the impulse response of an arbitrary digital filter having a magnitude and phase response that describes the shape of the primary pulse, and $x(n-n_k)$ are the subsequent pulses, copies of the primary pulse, delayed in time $n_k$ samples and having amplitudes of $\alpha_k$. Thus, the low-air alarm signal can be viewed as the convolution of the primary pulse shape (also referred to herein as a primary noise pulse component) with an impulse train p(n) (also referred to herein as a noise impulse train component):

$$s(n) = x(n) * p(n), \qquad \text{Eq. 2}$$

$$p(n) = \delta(n) + \sum_{k=1}^{M} \alpha_k \delta(n - n_k), \qquad \text{Eq. 3}$$

where δ(n) is an impulse occurring at time n. Since the primary alarm pulse waveform is related to subsequent pulses by convolution, they may be separated, in theory, using a deconvolution process such as cepstral deconvolution to 10 generate a deconvolved primary noise pulse cepstrum component and a deconvolved noise impulse train cepstrum component.

For the case of a windowed segment of a continuous signal containing only two low-air alarm pulses, and ignoring the effect of the window for the moment, the mathematical representation can be written as, $$s(n)=x(n)*p(n),$$

$$p(n)=\delta(n)+\alpha_1 x(n-n_1). \qquad \text{Eq. 4}$$

Taking the Fourier transform of Equation 4 we get the frequency domain representation:

$$S(e^{j\omega})=X(j\omega)P(j\omega),$$

$$S(e^{j\omega})=X(j\omega)(1+\alpha_1 e^{-j\omega n_1}). \qquad \text{Eq. 5}$$

To compute the cepstrum of this signal we first calculate the complex logarithm if Equation 5:

$$\log[S(e^{j\omega})]=\log[X(e^{j\omega})]+\log[(P(e^{j\omega})],$$

$$\log[S(e^{j\omega})]=\log[X(e^{j\omega})]+\log[(1+\alpha_1 e^{-j\omega n_1})]. \qquad \text{Eq. 6}$$

Thus, the convolution of the primary pulse and the impulse train has been transformed into a multiplication by the Fourier transform and further into an addition by the complex logarithm operation. Calculation of the complex logarithm requires a continuous phase signal. Since the FFT operation produces a discontinuous phase component (modulo 2π radians), a process of "phase unwrapping" is applied to the phase. This procedure is well known in the art and amounts to adding appropriate multiples of 2π radians to the disjointed phase segments. By applying the inverse Fourier transform to Equation 6 we transform the signal into the so-called "cepstral" domain and get, $$c(n) = \hat{x}(n) + \hat{p}(n), \qquad \text{Eq. 7}$$

$$\hat{p}(n) = \sum_{k=1}^{\infty} (-1)^{k+1} \frac{\alpha_1^k}{k} \hat{\delta}(n - kn_1)$$

where c indicates the complex "cepstrum" of the composite signal and the ˆ superscript has been added to the variables to indicate the domain change, wherein $\hat{x}(n)$ is the deconvolved primary noise pulse cepstrum component, and $\hat{p}(n)$ is the deconvolved noise impulse train cepstrum component.

In the cepstral domain the abscissa unit is time, and the convolved time domain signal components are additive. Note that the time windowing multiplication of the original signal is a convolution in the frequency domain and appears as frequency smearing of the components but does not affect their additive nature in the cepstral domain. The cepstral domain component due to the impulse train, $\hat{p}(n)$, appears as an alternating sign sequence of impulses spaced $n_k$ samples apart, falling off in amplitude as 1/n. The first impulse occurs at the pulse train period time. The separation in the cepstral domain between the primary pulse signal and the impulse train is inversely related to their periodicities in the frequency domain (i.e. directly proportional to the pulse periods). Thus, if the periodicity of the impulse train is much longer that the periodicities of the primary signal pulse $X(e^{j\omega})$, they will be well separated in time in the cepstral domain. If this is the case, the impulse sequence (and associated low-air alarm pulses), can be easily removed in the cepstral domain by filtering performed as simple editing ("liftering") of the cepstrum at the impulse locations, in essence removing $\hat{p}(n)$ from the cepstral representation. For two pulses this amounts to substantially zeroing the cepstrum at all multiples of the pulse repetition period.

Transformation of the "liftered" cepstral signal back to the time domain is then performed by reversing the cepstral transformation process. The result is the primary pulse minus any secondary noise pulses in the processing window. Note that in this embodiment the Fourier transform approach has been used to calculate the cepstrum of the signal. However, there are other methods of doing this that are known in the art such as a recursive method, and this representation does not preclude the use of these other methodologies.

With actual data the above analysis can be more complicated. For instance, sequential LAA pulses, produced by a mechanical device, are not necessarily identical. In this case, the impulses representing the time locations of the secondary pulse(s) are not delta functions but instead are the impulse response(s) of the transfer function(s) defining the primary pulse from the differing secondary pulse shapes. If the pulse shape transforming transfer function is low-pass the impulses will appear somewhat smeared out instead of impulsive. If additive noise or other signals are present (e.g. speech), the cepstrum of the impulse train is typically more complicated and distributed. An advantage in applying this deconvolution technique to the low-air alarm noise problem is that the alarm pulse periodicity is much longer (20-40 msec) than the average voiced speech pitch period (8-10 msec), making the two periodic components well separated in the cepstral domain and thus easier to separate. Thus removing the periodic component of the low-air alarm noise usually does not affect the periodic component of the speech.

The details of the Cepstral Deconvolver and Filter process 640, the theory of which was described above, will now be described. Filter 640 comprises a windowing function 1004, an FFT block 1010, a log/phase unwrap block 1020, an inverse FFT block 1030, a liftering block 1040, an adaptive lifter generator 1050, an FFT block 1060, a complex exponentiation block 1070, an inverse FFT block 1080 and an un-windowing function 1090. In operation, a frame of data s(i,n) (740) is passed to processing block 1004 of block 640 shown in FIG. 10. The purpose of this block is to apply a data window to the samples in the analysis frame. In one embodiment a window known as a Hamming window is first applied to the frame data. This windowing tapers the values of the data samples in the frame, especially at the edges and has the desired effect of improving the spectral representation of the windowed signal in the frequency domain. Data windowing is well known in the art. Other types of symmetric windows such as a raised $\cos^4$ window may also be used to improve the performance of the CANA method.

In addition, another window known as an exponential window to those skilled in the art may be applied to the data in the analysis frame. This window may be defined as:

$$\beta(n) = a^n,\ 0 <= n <= l, \qquad \text{Eq. 8}$$

where l is the length of the analysis frame data sequence. The base a, in one embodiment, is equal to 0.997 although other values may be used for improved results depending on the data. The purpose of this window is to make the process of calculating the complex cepstrum of the analysis data frame s(i,n) more stable. It accomplishes this by moving poles and zeros of s(i,n) away from the z-plane unit circle, making the signal more minimum phase, and minimum or maximum phase signals are more stable in terms of calculation of the cepstrum. In addition to the windowing, the data frame is padded with zeros to a length of N=1024 sample points. This makes use of an FFT algorithm possible and makes the job of phase unwrapping described previously in the theory, easier by over-sampling the phase spectrum. Note that N can be greater than 1024 sample points, a power of two, so that finer frequency resolution may be obtained, though at the cost of more computation.

The windowed analysis frame data is then Fourier Transformed into the frequency domain using an FFT algorithm known to those skilled in the art. This is illustrated by block 1010 in FIG. 10 and was described mathematically in Eq. 5. Next, block 1020 takes the complex logarithm of the frequency domain representation of s(i,n) as described previously by Eq. 6. This involves taking the log of the values of the magnitude spectrum, Log|S(i,jω)|, and computing and unwrapping the phase component to obtain a continuous phase component, Arg[S(i,jω)]. Block 1030 then computes the inverse FFT of the signal Log[S(i,jω)] to transform it into the cepstral domain, with the complex cepstrum of the analysis signal frame being represented as c(i,n) in FIG. 10.

Block 1050 in FIG. 10 represents the Adaptive Lifter Generator process. A so-called "lifter" is the equivalent of a time domain filter. A lifter is a function applied to the cepstrum of a signal designed to eliminate a specific cepstral signal component. Since signals that are combined by convolution in the time domain are additive in the cepstral domain, a lifter can be designed to be a specified binary sequence used to multiply (i.e. mask) a signal cepstrum, thus removing undesired components. With regard to the CANA method and elimination of the periodic pulse component of the low-air alarm noise, the lifter is designed to have a value of "0" at the time delays of the impulses corresponding to the pulse train, and a value of "1" everywhere else. In the CANA method, in block 1050, a lifter function L(i,n) is generated for each data frame according to the low-air alarm noise pulse period (850) for that frame, which may change over time. The lifter function is generated such that L(i,n)=ALG[T(i)]. L(i,n)=1.0 for all values of n except where n represents a multiple of the pulse period. ALG[T(i)] may be defined as:

$$L(i, n) = 0.0, \quad n \ \forall \ (jT_n(i) - np) <= n <= (jT_n(i) + np), \qquad \text{Eq. 9}$$

$$j = 0, 1, 2, \ldots$$

$$T_n(i) = T(i)(srate).$$

$$0 <= n <= \frac{N}{2}. \qquad \text{Eq. 10}$$

$$N <= n <= \frac{N}{2} + 1. \qquad \text{Eq. 11}$$

Note that the complex cepstrum is two sided and symmetrical about the origin at index N/2. The positive part or minimum phase component is defined over the interval in Eq. 10 and the maximum phase component over the interval defined by Eq. 11. The lifter index is measured from the start of each interval. srate is the sampling rate which in one embodiment is 8000.0 s/sec. The variable np is a defined number of samples, usually between 2 and 4 samples that widens the lifter around the locations of the cepstral impulse components. This is done to account for the fact that the calculated pulse period T(i) may not be exact, and the cepstral impulses due to the pulse train may be smeared due to the in-exactness of sequential basic pulse waveforms.

The calculated lifter function is used by processing block 1040 to multiply the cepstrum of the analysis frame cepstrum, c(i), thereby eliminating (or at least substantially eliminating) the cepstral component of the pulse train of the low-air alarm noise. The liftered cepstrum, designated by c(i), is then put through the reverse transformation processes designated by blocks 1060, 1070, 1080, and 1090 in FIG. 10. A forward FFT is performed by block 1060; the frequency domain magnitude is then exponentiated in block 1070; an inverse FFT is performed by block 1080 to transform the signal back into the time domain; and the windowing operations are undone by operations performed by block 1090. The result is a new signal frame 1094, s(i,n), that has substantially or completely removed all alarm pulses except the initial basic pulse waveform.

Figure 11:
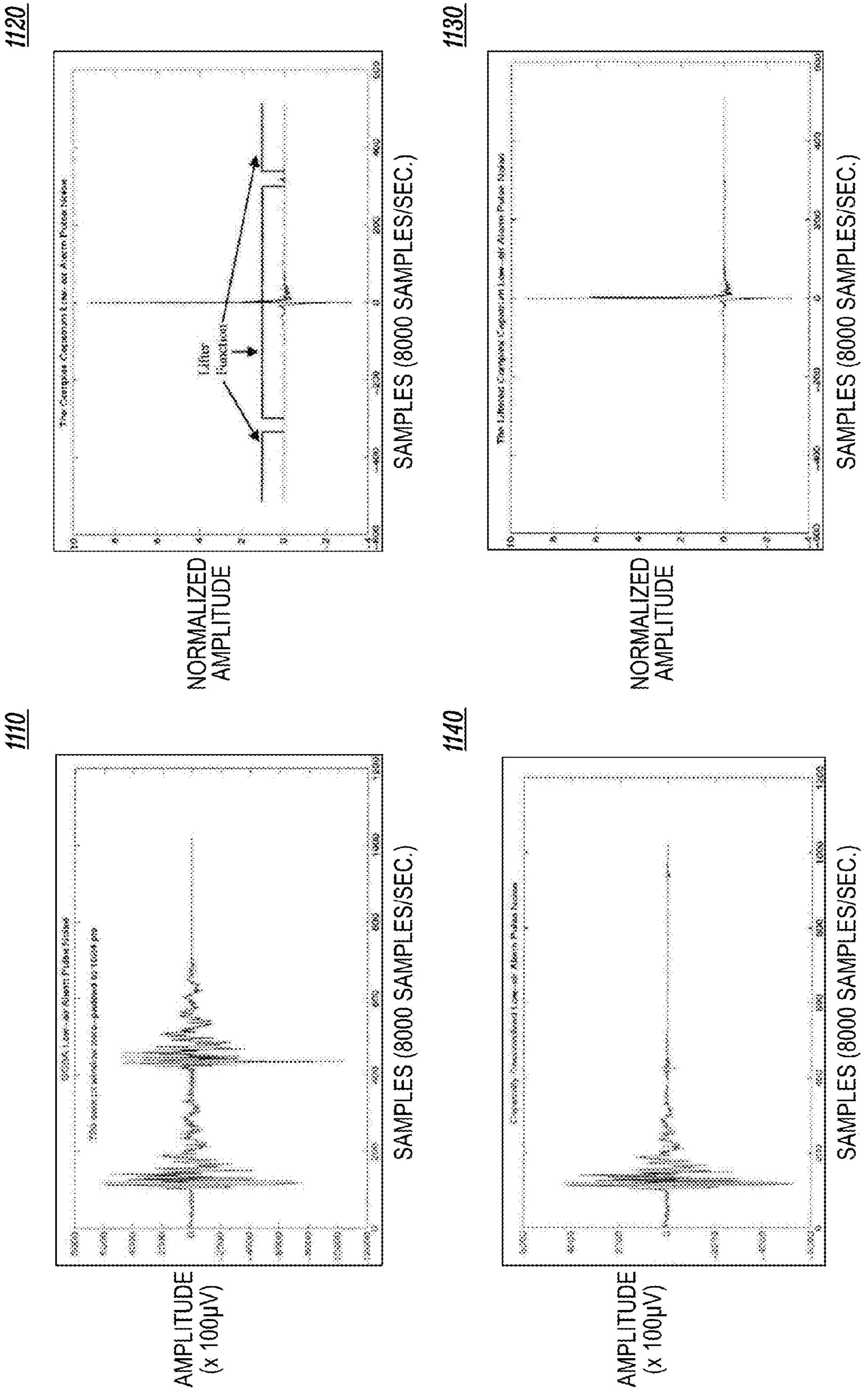
FIG. 11 illustrates waveform examples depicting the cepstral deconvolution process performed by the Cepstral Deconvolver and Filter of FIG. 10.

Examples of the waveforms produced by processor block 640 are shown in FIG. 11. 1110 shows one analysis data frame zero-padded to 1024 samples and containing two low-air alarm pulses. 1120 shows the complex cepstrum of this analysis data frame signal. Note the peak at around 320 samples which is due to the cepstrum of the pulse train component of the low-air alarm noise. Also shown in 1120 superimposed is the lifter function used to remove the pulse train cepstral peak. 1130 shows the cepstrum after the liftering operation. 1140 shows the analysis frame signal after transformation back to the time domain where the second pulse has been eliminated due to the liftering operation.

Figure 12:
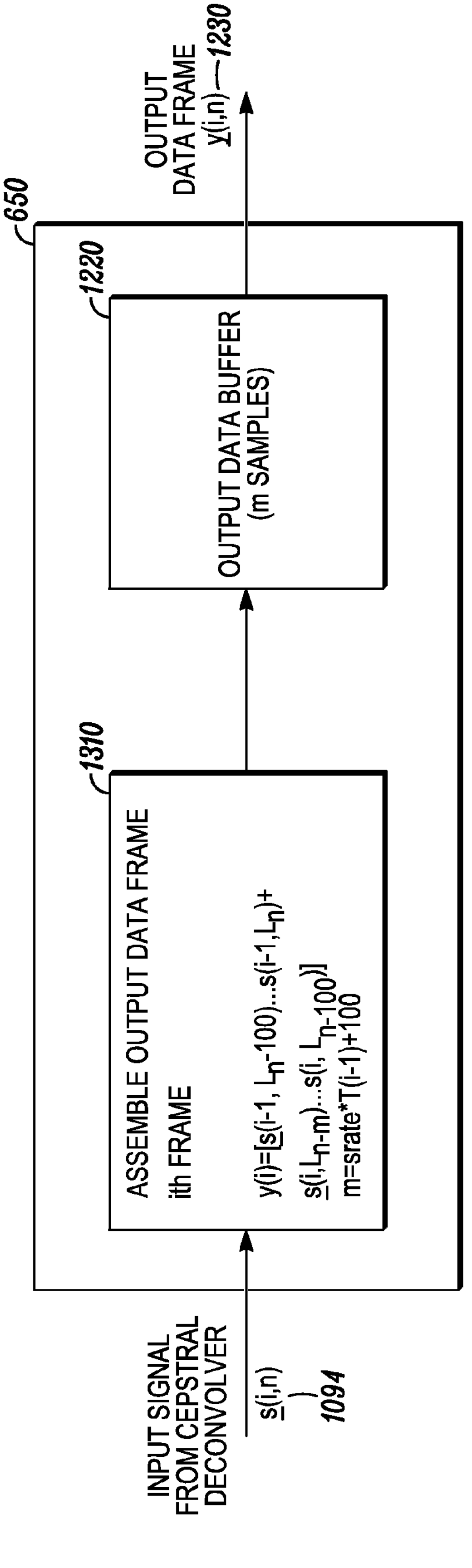
FIG. 12 illustrates a block diagram of an Add/Overlap Output Signal Synthesizer processor for re-combining the processed frames of data generated by the CANA method of FIG. 6.

The last processor of the CANA method is block 650 of FIG. 6, the Output Data Buffering Add/Overlap Synthesizer, which is described in more detail in FIG. 12 and comprises an assemble output data frame block 1210 and an output data buffer 1220. The purpose of this processor is to remove the remaining low-air alarm pulse in each frame left by the cepstral deconvolution process, and re-assemble the frame data into a continuous data stream. In general, this is accomplished by a single set of add/overlap operations. During processing by block 650, the second pulse of the low-air alarm is eliminated in the later part of an analysis frame s(i-1,n) output by processor block 640. This pulse is also set to be the first, basic pulse waveform in the following frame s(i,n). Having sequential frames overlap by 50%, the later portions of adjacent frames can be appropriately combined to form a single new frame that does not contain either of the low-air alarm pulses. In order to smoothly combine the frames of some overlapping areas of the two frames, the end of valid data from frame s(i-1,n), and the start of valid data from frame s(i,n) are tapered with a window function. This add/overlap process 650 is shown pictorially in FIG. 13.

Depending on the duration of each low-air alarm pulse and based on the fact that each analysis frame contains at least two noise pulses, valid data (the portion of the liftered signal, e.g., 1312 where the pulse waveform has been eliminated), e.g., 1314, can be assumed to exist from the end of each data frame to the middle of the frame. Based on analysis of various low-air alarm noises, the pulse duration is known to be less than half the pulse repetition rate. Assuming the frame length to be $L_n$ samples, valid output data exists in the segment $L_n$-m . . . $L_n$ where m is half the number of samples in an analysis data frame, e.g., 1316. Based on empirical knowledge of the pulse waveform duration, the valid output data section can conservatively be extended by an extra 100 samples. Thus, the valid output data section of each analysis data frame can be defined by the samples with indices $L_n$-m-100 . . . $L_n$. The extra samples allow for frame overlap so that a complete half frame of data can be output for each pair of overlapping frames, e.g., 1318.

Figure 13:
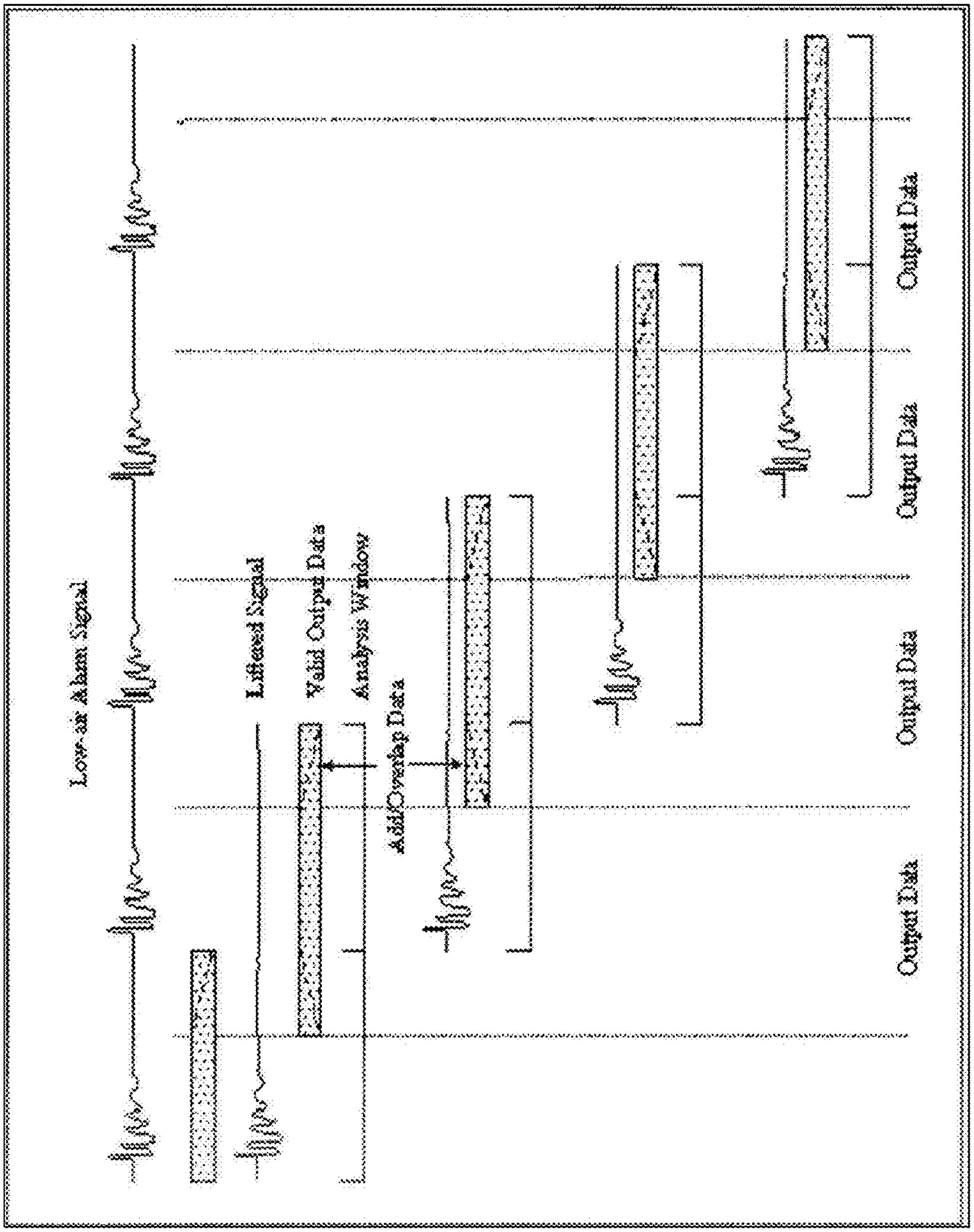
FIG. 13 illustrates pictorially the actions performed by the Add/Overlap Output Signal Synthesizer processor for re-combining the processed frames of data generated by the CANA method of FIG. 6.

To allow a smooth overlap of the first and last 100 samples of each valid output data section, the first 100 samples and the last 100 samples are windowed (tapered) using an appropriate half Hamming window function, for example, as illustrated in FIG. 13. To form a frame of output data, the last 100 windowed samples of analysis data frame s(i-1,n) are added to the first 100 samples of the valid output data section of frame s(i,n). This data segment is combined with samples $L_n$-m . . . $L_n$-100 of analysis sample frame s(i,n) to form a complete Output Data frame 1230 of FIG. 12 of length m samples ($L_n$-m-100 . . . $L_n$-100), which is the same number of new samples read in by block 730 (FIG. 7) of block 610 (FIG. 6). Note that the last half the data frame s(i-1,n) is ideally saved at each frame processing time so that it can be combined with data from the current frame s(i,n). The output data frame is referred to as y(i) 1230 in FIG. 12. This block of data is stored in data buffer 1220 and output before the next data block is assembled by process 1210 of 1200 in FIG. 12.

Figure 14:
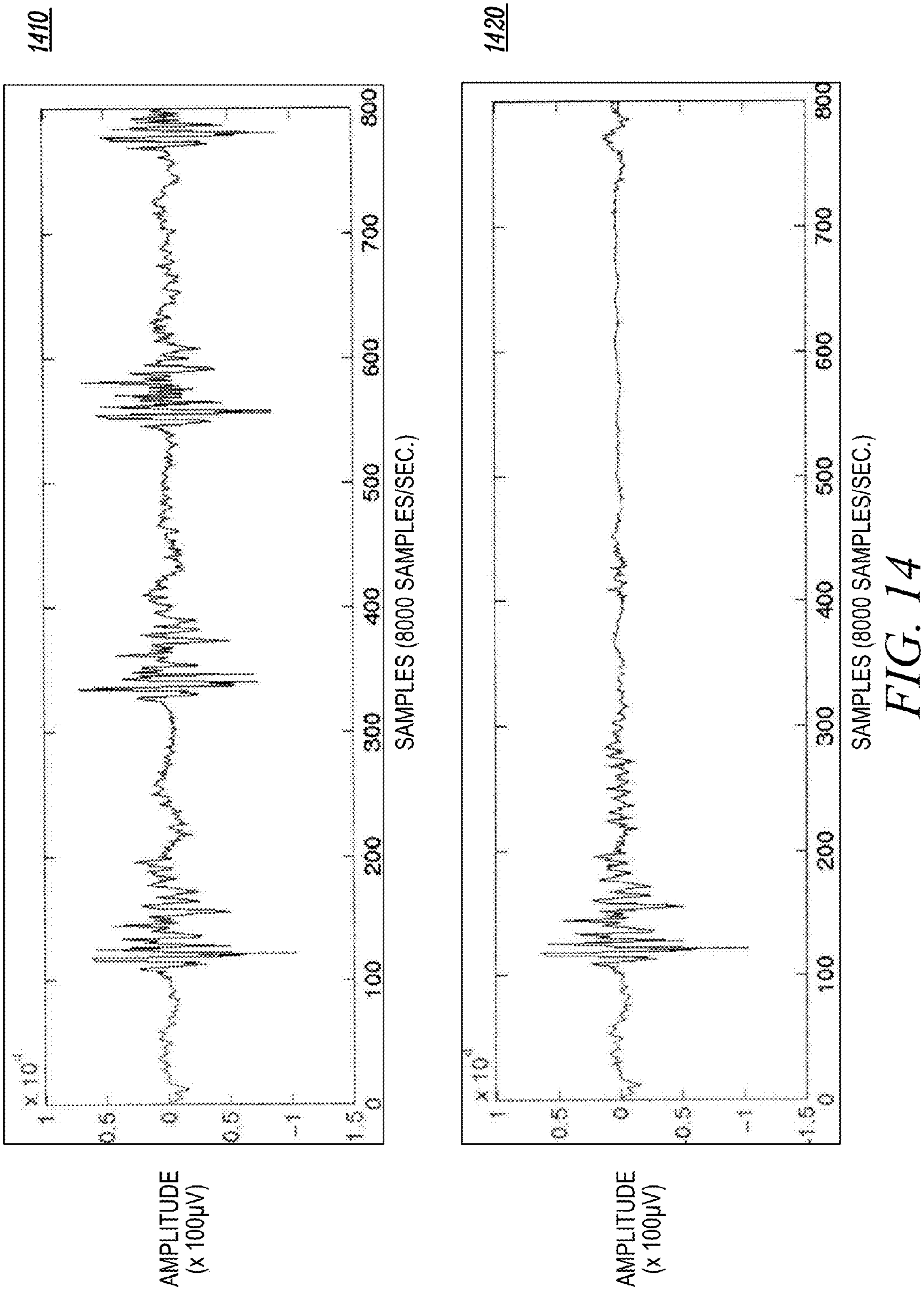
FIG. 14 illustrates an example of the resulting output of the Add/Overlap Output Signal Synthesizer processor of the CANA method of FIG. 6.

FIG. 14 shows an example of a portion of a low-air alarm signal processed by the CANA method just described. The input is shown in 131 0. The output is shown in 1320 and is a composite of three analysis frames of data that were processed by the CANA method as described above and were output by CANA method processor block 650. Note that all of the pulses have been removed except the initial pulse of the first data frame which has no predecessor frame.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method for removing periodic noise pulses from a continuous audio signal generated in a pressurized air delivery system, the method comprising the steps of:

detecting, in a time-windowed segment of the continuous audio signal generated in the pressurized air delivery system, a plurality of the periodic noise pulses each possessing a pulse period, wherein the periodic noise pulses of the continuous audio signal is representable in the form of a plurality of signal components combined by convolution;

deconvolving the plurality of signal components to generate a plurality of deconvolved signal components; and removing at least a portion of the periodic noise pulses from the time-windowed segment of the continuous audio signal using the deconvolved signal components.

2. The method as recited in claim 1, wherein the periodic noise pulses comprises low-air alarm noise pulses.

3. The method as recited in claim 1, wherein the continuous audio signal further comprises speech having a pitch period that is less than the pulse period of the plurality of the periodic noise pulses.

4. The method as recited in claim 1, wherein detecting the plurality of the periodic noise pulses in the time-windowed segment comprises the steps of:

detecting presence of a first and a second noise pulse in the time-windowed segment; and estimating the pulse period based on location of the first and second noise pulses in the time-windowed segment.

5. The method as recited in claim 4, wherein detecting presence of the first and second noise pulses in the time-windowed segment comprises the steps of:

low-pass filtering the time-windowed segment;

down-sampling the low-pass filtered time-windowed segment within a first predefined limit; and locating a first and a second maximum spectral energy peak satisfying at least one predefined parameter, wherein the first and second maximum spectral energy peaks correspond, respectively, to the first and second noise pulses.

6. The method as recited in claim 5, wherein the at least one predefined parameter comprises at least one of a maximum periodicity threshold and a minimum energy threshold.

7. The method as recited in claim 4 further comprising the step of adjusting a size of a time-windowed segment of the continuous audio signal based on the estimated pulse period.

8. The method as recited in claim 1, wherein the plurality of signal components are deconvolved using cepstral deconvolution.

9. The method as recited in claim 8, wherein the plurality of signal components comprises a primary noise pulse component and a noise impulse train component combined by convolution and wherein deconvolving the plurality of signal components comprises estimating a deconvolved primary noise pulse cepstrum component and a deconvolved noise impulse train cepstrum component.

10. The method as recited in claim 9, wherein estimating the deconvolved primary noise pulse cepstrum component and the deconvolved noise impulse train cepstrum component comprises the steps of:

estimating the plurality of signal components as a mathematical expression;

applying a Fast Fourier Transform (FFT) to the mathematical expression to generate an FFT expression of the plurality of signal components;

calculating a logarithm of the FFT expression to generate a logarithm expression of the FFT expression; and applying an inverse FFT to the logarithm expression to estimate the deconvolved primary noise pulse cepstrum component and the deconvolved noise impulse train cepstrum component.

11. The method as recited in claim 9, wherein removing at least a portion of the periodic noise pulses comprises substantially attenuating the deconvolved noise impulse train cepstrum component to substantially remove the periodic noise pulses from a latter portion of the time-windowed segment.

12. The method as recited in claim 11 further comprising the steps of:

generating a plurality of successive time-windowed segments of the audio signal each comprising a plurality of the periodic noise pulses, wherein a portion of the noise pulses included in a latter portion of one time-windowed segment is also included in an initial portion of a succeeding time-windowed segment;

performing the detecting, deconvolving and removing steps for each of the time-windowed segments; and adding substantially the latter portion of all of the time-windowed segments to substantially attenuate the periodic noise pulses from the continuous audio signal.

13. A device for removing low-air alarm noise pulses from a continuous audio signal generated in a pressurized air delivery system, the device comprising: an interface receiving the continuous audio signal; and a processing device coupled to the interface and:

detecting, in a time-windowed segment of the continuous audio signal generated in the pressurized air delivery system, a plurality of the periodic noise pulses each possessing a pulse period, wherein the periodic noise pulses of the continuous audio signal is representable in the form of a plurality of signal components combined by convolution;

deconvolving the plurality of signal components using cepstral deconvolution to generate a plurality of deconvolved cepstrum signal components; and removing at least a portion of the low-air alarm noise pulses from the time-windowed segment of the continuous audio signal using the deconvolved cepstrum signal components.

14. The device as recited in claim 13, wherein the plurality of signal components comprises a primary noise pulse component and a noise impulse train component combined by convolution, and wherein deconvolving the plurality of signal component comprises estimating a deconvolved primary noise pulse cepstrum component and a deconvolved noise impulse train cepstrum component;

removing at least a portion of the periodic noise pulses comprises substantially attenuating the deconvolved noise impulse train cepstrum component to substantially remove the periodic noise pulses from a latter portion of the time-windowed segment;

generating a plurality of successive time-windowed segments of the audio signal each comprising a plurality of the periodic noise pulses, wherein a portion of the noise pulses included in a latter portion of one time-windowed segment is also included in an initial portion of a succeeding time-windowed segment;

performing the detecting, deconvolving and removing steps for each of the time-windowed segments; and adding substantially the latter portion of all of the time-windowed segments to substantially attenuate the periodic noise pulses from the continuous audio signal.

15. The device as recited in claim 13, wherein the device is included in at least one of:

a communication device coupled to the pressurized air delivery system;

a microphone coupled to a mask comprising the pressurized air delivery system; and apparatus external to the communication device and the microphone.

16. The device as recited in claim 13, wherein the processing device is a digital signal processor.

17. A computer-readable storage element having computer readable code stored thereon for programming a computer to perform a method for removing periodic noise pulses from a continuous audio signal generated in a pressurized air delivery system, the method comprising the steps of:

detecting, in a time-windowed segment of the continuous audio signal generated in the pressurized air delivery system, a plurality of the periodic noise pulses each possessing a pulse period, wherein the periodic noise pulses of the continuous audio signal is representable in the form of a plurality of signal components combined by convolution;

deconvolving the plurality of signal components to generate a plurality of deconvolved signal components; and removing at least a portion of the periodic noise pulses from the time-windowed segment of the continuous audio signal using the deconvolved signal components.

18. The computer-readable storage medium as recited in claim 17, wherein the computer readable storage medium comprises at least one of a hard disk, a CD-ROM, an optical storage device and a magnetic storage device.

19. The computer-readable storage medium as recited in claim 17, wherein the plurality of signal components are deconvolved using cepstral deconvolution.

20. The computer-readable storage medium as recited in claim 19, wherein the plurality of signal components comprises a primary noise pulse component and a noise impulse train component combined by convolution, the code stored thereon programming the computer for deconvolving the plurality of signal component comprises programming the processing device for estimating a deconvolved primary noise pulse cepstrum component and a deconvolved noise impulse train cepstrum component, and the code stored thereon programming the computer for removing at least a portion of the periodic noise pulses comprises programming the processing device for substantially attenuating the deconvolved noise impulse train cepstrum component to substantially remove the periodic noise pulses from a latter portion of the time-windowed segment, the code stored thereon further programming the computer for performing the steps of:

generating a plurality of successive time-windowed segments of the audio signal each comprising a plurality of the periodic noise pulses, wherein a portion of the noise pulses included in a latter portion of one time-windowed segment is also included in an initial portion of a succeeding time-windowed segment;

performing the detecting, deconvolving and removing steps for each of the time-windowed segments; and adding substantially the latter portion of all of the time-windowed segments to substantially attenuate the periodic noise pulses from the continuous audio signal.

* * * * *

UNITED STATES PATENT AND TRADEMARK OFFICE

CERTIFICATE OF CORRECTION

PATENT NO. : 7,809,559 B2
APPLICATION NO. : 11/459379
DATED : October 5, 2010
INVENTOR(S) : Kushner et al.

It is certified that error appears in the above-identified patent and that said Letters Patent is hereby corrected as shown below:

IN THE SPECIFICATION

1. In Column 10, Line 46, delete "to10" and insert -- to --, therefor.

2. In Column 10, Line 64, delete "if" and insert -- of --, therefor.

Signed and Sealed this
Twenty-eighth Day of August, 2012

David J. Kappos
*Director of the United States Patent and Trademark Office*